(12) United States Patent
Maeno

(10) Patent No.: US 7,161,910 B2
(45) Date of Patent: Jan. 9, 2007

(54) MINIMUM COST ROUTING BASED ON RELATIVE COSTS OF NODE RESOURCES

(75) Inventor: Yoshiharu Maeno, Tokyo (JP)

(73) Assignee: NEC Corporation, Tokyo (JP)

( * ) Notice: Subject to any disclaimer, the term of this patent is extended or adjusted under 35 U.S.C. 154(b) by 918 days.

(21) Appl. No.: 10/083,401

(22) Filed: Feb. 27, 2002

(65) Prior Publication Data

US 2002/0118647 A1   Aug. 29, 2002

(30) Foreign Application Priority Data

Feb. 28, 2001   (JP) ............................. 2001-053447

(51) Int. Cl.
*H04L 12/54* (2006.01)
(52) U.S. Cl. ...................... 370/258; 370/369
(58) Field of Classification Search ................ 370/465, 370/480, 369, 534–535; 359/124
See application file for complete search history.

(56) References Cited

U.S. PATENT DOCUMENTS

| | | | |
|---|---|---|---|
| 4,737,951 A * | 4/1988 | Kruger et al. ............... | 370/217 |
| 5,884,036 A * | 3/1999 | Haley ......................... | 709/224 |
| 6,456,594 B1 * | 9/2002 | Kaplan et al. ............... | 370/238 |
| 6,570,872 B1 * | 5/2003 | Beshai et al. ............... | 370/369 |
| 6,701,088 B1 * | 3/2004 | Watanabe et al. ............. | 398/51 |
| 6,798,991 B1 * | 9/2004 | Davis et al. .................. | 398/19 |
| 2001/0019540 A1 * | 9/2001 | Uematsu et al. ............. | 370/258 |
| 2002/0018264 A1 * | 2/2002 | Kodialam et al. ........... | 359/128 |

FOREIGN PATENT DOCUMENTS

| | | |
|---|---|---|
| JP | 7-250356 | 9/1994 |
| JP | 10-276208 | 10/1998 |

OTHER PUBLICATIONS

Minimum cost wavelength-path routing and wavelength allocation using a genetic-algorithm/heuristic hybrid approach Sinclair, M.C.; Communications, IEE Proceedings-vol. 146, Issue 1, Feb. 1999 pp. 1-7.*
Sinclair (Minimum cost wavelength-path routing and wavelength allocation using a genetic-algorithm/heuristic hybrid approach Sinclair, M.C.; Communications, IEE Proceedings-vol. 146, Issue 1, Feb. 1999 pp. 1-7).*

* cited by examiner

*Primary Examiner*—Hassan Kizou
*Assistant Examiner*—Salman Ahmed
(74) *Attorney, Agent, or Firm*—Dickstein Shapiro LLP

(57) ABSTRACT

In a communications network, each network node includes a first module that handles a group of channels between its input and output ports as a route decision unit and a second module that handles a channel between its input and output ports as a route decision unit. A module state database stores module cost data of the first and second modules and a link state database stores link cost data of the links. Using the module and link state databases a route of minimum cost is determined and a connection is established between an incoming link and one of the input ports of the first and second modules and a connection is established between one of the output ports of the first and second modules and an outgoing link. The contents of the module and state databases are broadcast to the network.

29 Claims, 10 Drawing Sheets

FIG. 2
MODULE STATE DATABASE

|  |  | ENTRY 1 | | | | ENTRY 2 | | | | ENTRY 3 | |
|---|---|---|---|---|---|---|---|---|---|---|---|
| MODULE | MODULE NO. | GSM 26 | | | | CSM 27 | | | | GRM 28 | |
|  | MODULE TYPE | GROUP SWITCH | | | | CHANNEL SWITCH | | | | GROUP REG. | |
|  | WVLN CONV. | UNAVAILABLE | | | | AVAILABLE | | | | UNAVAILABLE | |
| PATH NUMBER | | P1 | P6 | — | — | P2 | P3 | — | — | P4 | P5 |
| INPUT PORT | PORT NO. | IP1 | IP2 | IP3 | IP4 | IP5 | IP6 | IP7 | IP8 | IP9 | IP10 |
|  | PORT GRP NO. | IPG1 | | IPG2 | | — | — | — | — | IPG3 | |
|  | PORT COST | 1 | 1 | 1 | 1 | 2 | 2 | 2 | 2 | 1 | 1 |
|  | AVAILABLE WAVELENGTH | ARB. | ARB. | — | — | $\lambda 2$ | $\lambda 1$ | — | — | $\lambda 2$ | $\lambda 4$ |
|  | AVAILABLE DATA FORMAT | ARB. | ARB. | — | — | SONET | SONET | — | — | SONET | SONET |
|  | MAX. DATA RATE (GBPS) | ARB. | ARB. | — | — | 2.5 | 2.5 | — | — | 2.5 | 2.5 |
|  | INTERFACE NO. | IC20 | IC22 | — | — | IC21 | IC24 | — | — | IC26 | IC27 |
| OUTPUT PORT | PORT NO. | OP1 | OP2 | OP3/OP4 | | OP5 | OP6 | OP7/OP8 | | OP9 | OP10 |
|  | PORT GRP NO. | OPG1 | | OPG2 | | — | — | — | — | OPG3 | |
|  | PORT COST | 1 | 1 | 1 | 1 | 2 | 2 | 2 | 2 | 1 | 1 |
|  | AVAILABLE WAVELENGTH | DEP. | DEP. | — | — | ARB. | ARB. | — | — | $\lambda 2$ | $\lambda 4$ |
|  | AVAILABLE DATA FORMAT | DEP. | DEP. | — | — | SONET | SONET | — | — | SONET | SONET |
|  | MAX. DATA RATE (GBPS) | DEP. | DEP. | — | — | 2.5 | 2.5 | — | — | 2.5 | 2.5 |
|  | INTERFACE NO. | OG24 | OG22 | — | — | OG23 | OG20 | — | — | OG26 | OG27 |

LEGEND: ARB. = ARBITRARY
DEP. = DEPENDENT ON INPUT PORT WAVELENGTH, FORMAT AND RATE

FIG. 3
LINK STATE DATABASE

| FIELD | ENTRY 1 | ENTRY 2 | ENTRY 3 | ENTRY 4 | ... | ENTRY m |
|---|---|---|---|---|---|---|
| TRANSMIT NODE ADDRESS | NODE-1 | NODE-1 | NODE-1 | NODE-1 | | |
| RECEIVE NODE ADDRESS | NODE-2 | NODE-2 | NODE-3 | NODE-3 | | |
| OUTGOING IF NUMBER | OG10 | OG12 | OG10 | OG12 | | |
| INCOMING IF NUMBER | IC20 | IC22 | IC30 | IC32 | | |
| LINK COST | 1 | 1 | 4 | 4 | | |
| CHANNEL COST | $\lambda 1$ | $\lambda 3$ | | | | |
| WAVELENGTH | | | $\lambda 1$ | $\lambda 3$ | | |
| INCOMING WAVELENGTH | | | $\lambda 1$ | $\lambda 3$ | | |
| OUTGOING WAVELENGTH | | | | | | |
| DATA FORMAT | SONET | SONET | SONET | SONET | | |
| MAXIMUM DATA RATE | 10 GBPS | 10 GBPS | 10 GBPS | 10 GBPS | | |
| PATH NUMBER | P1 | P6 | P1 | P6 | | |

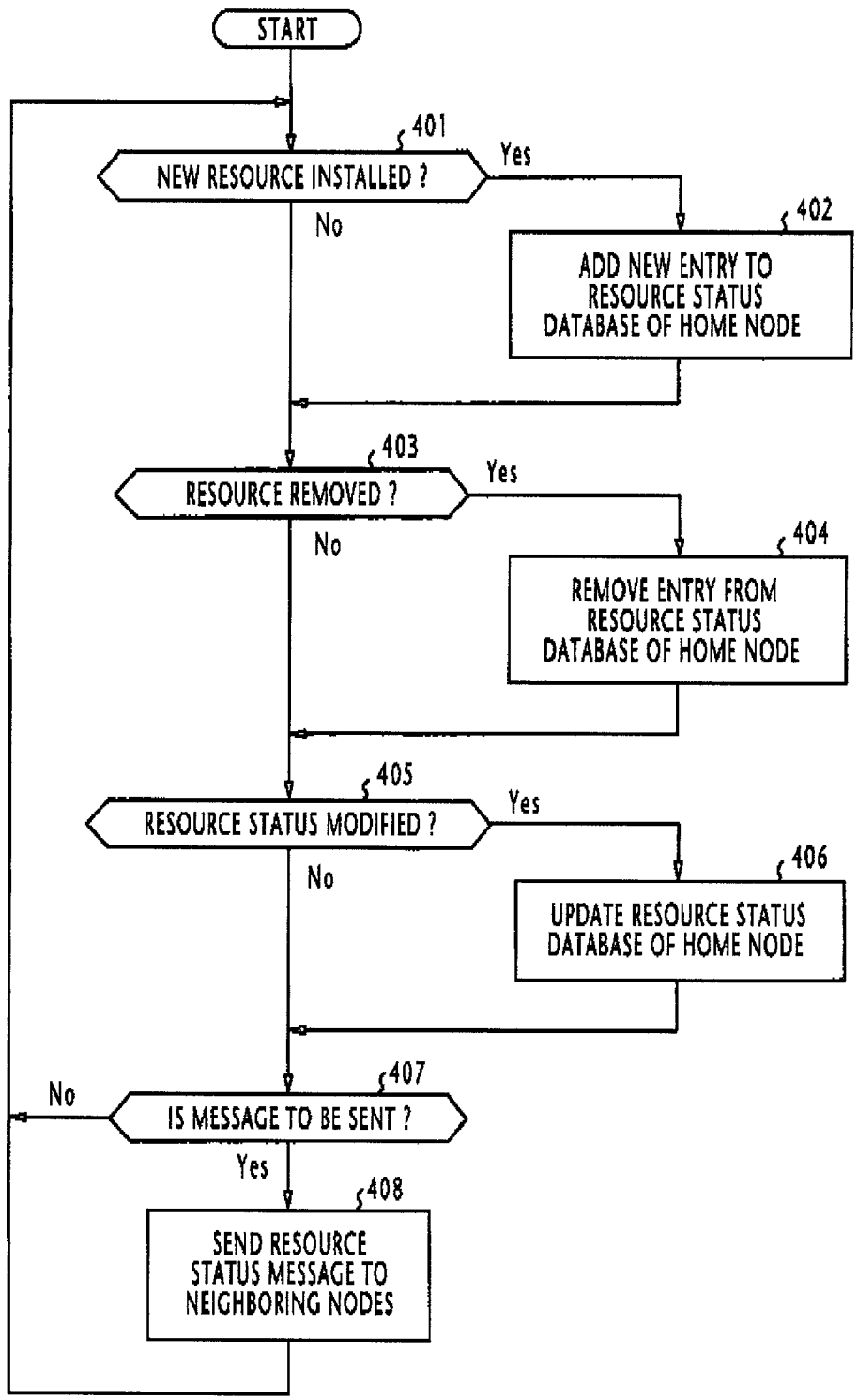

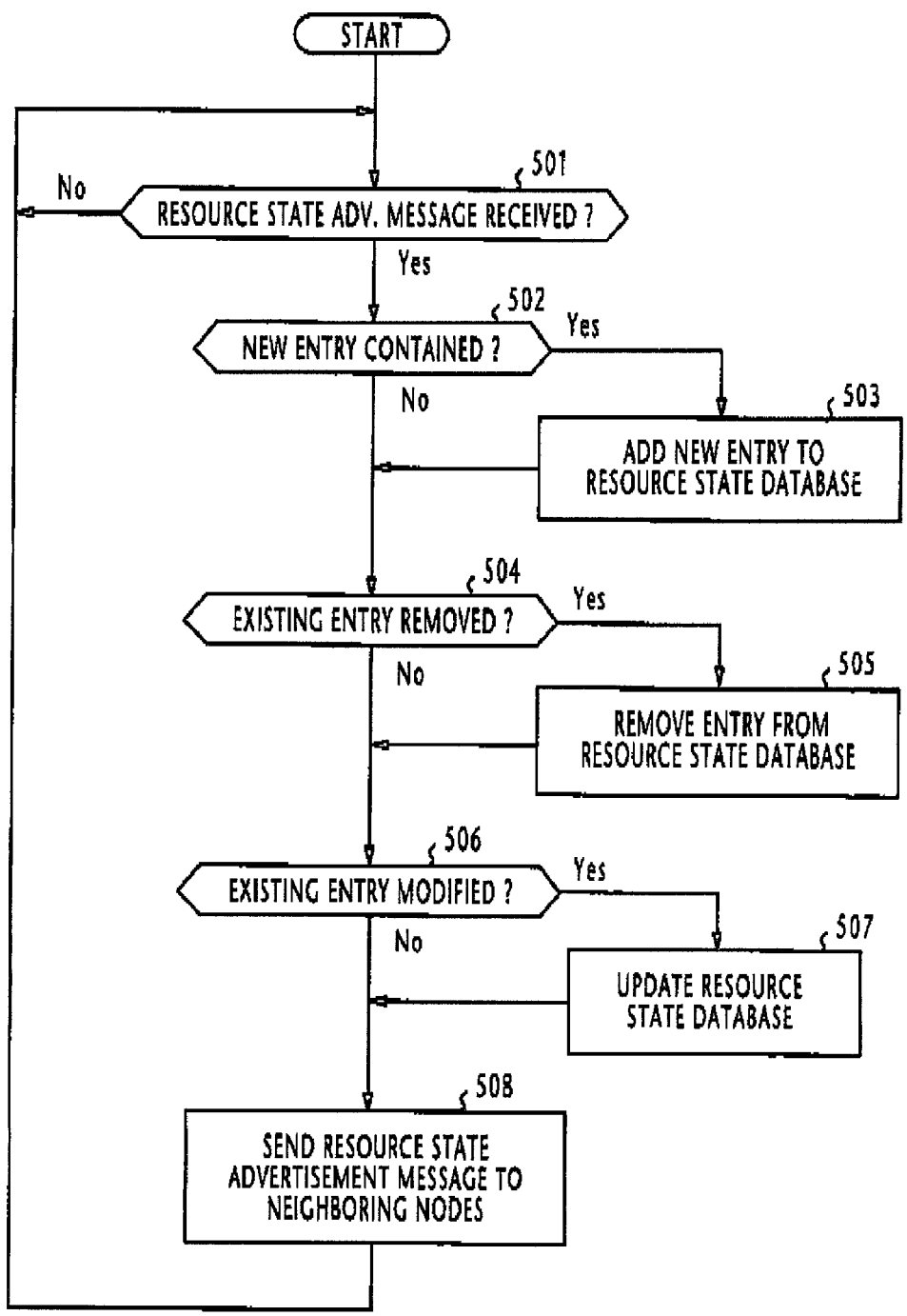

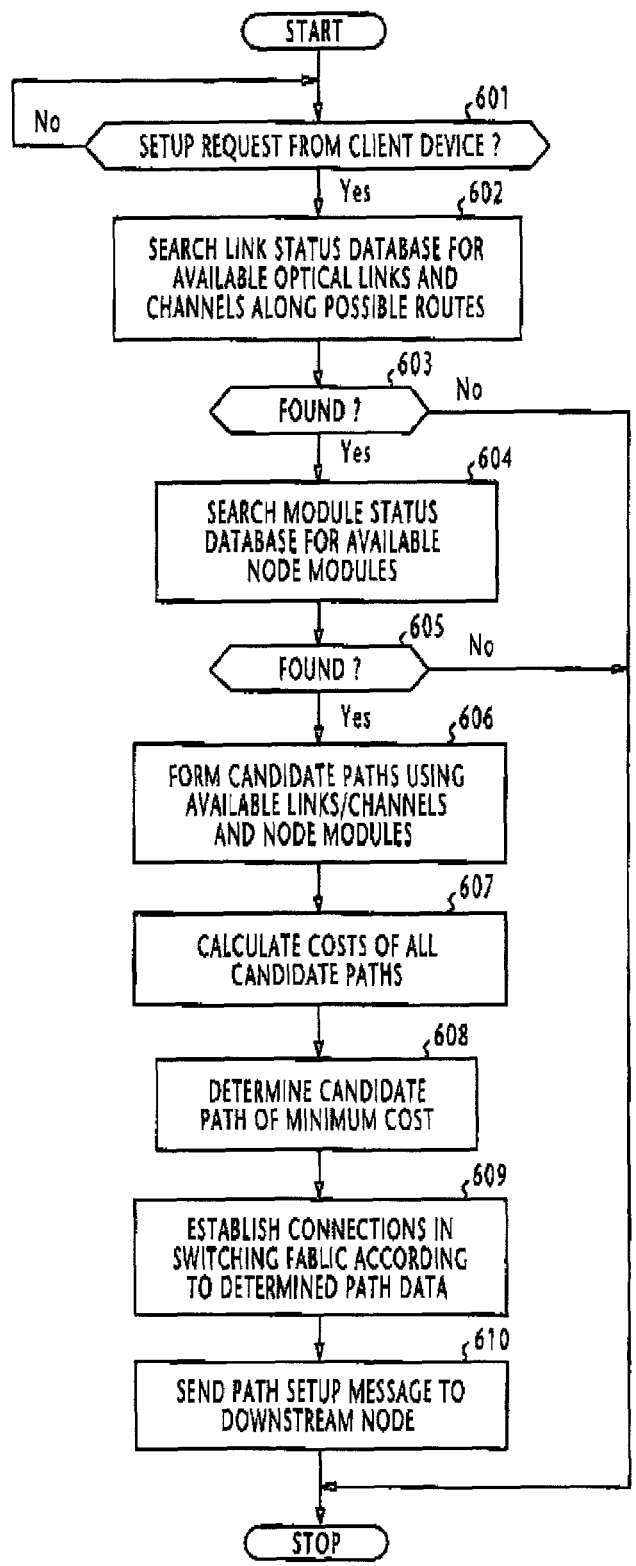

FIG. 8

MODULE STATE DATABASE

<table>
<tr><td colspan="2"></td><td colspan="4">ENTRY 1</td><td colspan="2">ENTRY 2</td><td>ENTRY 3</td></tr>
<tr><td rowspan="3">MODULE</td><td>MODULE NO.</td><td colspan="4">LSM 51</td><td colspan="2">CSM 52</td><td>CRM 53</td></tr>
<tr><td>MODULE TYPE</td><td colspan="4">GROUP SWITCH</td><td colspan="2">CHANNEL SWITCH</td><td>CHANNEL REG.</td></tr>
<tr><td>WVLN CONV.</td><td colspan="4">UNAVAILABLE</td><td colspan="2">AVAILABLE</td><td>UNAVAILABLE</td></tr>
<tr><td colspan="2">PATH NUMBER</td><td>P1</td><td>P2</td><td>P3</td><td>P4</td><td>P5</td><td>P6</td><td></td></tr>
<tr><td rowspan="6">INPUT PORT</td><td>PORT NO.</td><td colspan="4">IP1</td><td colspan="2">IP3</td><td></td></tr>
<tr><td>PORT COST</td><td colspan="4">1</td><td colspan="2">2</td><td></td></tr>
<tr><td>AVAILABLE WAVELENGTH</td><td colspan="4">λ1, λ2</td><td colspan="2">λ3</td><td></td></tr>
<tr><td>AVAILABLE DATA FORMAT</td><td colspan="4">SONET</td><td colspan="2">SONET</td><td></td></tr>
<tr><td>MAX. DATA RATE (GBPS)</td><td colspan="4">2.5</td><td colspan="2">2.5</td><td></td></tr>
<tr><td>INTERFACE NO.</td><td colspan="4">IC20</td><td colspan="2">IC21</td><td></td></tr>
<tr><td rowspan="6">OUTPUT PORT</td><td>PORT NO.</td><td colspan="4">OP1</td><td colspan="2">OP3</td><td></td></tr>
<tr><td>PORT COST</td><td colspan="4">1</td><td colspan="2">2</td><td></td></tr>
<tr><td>AVAILABLE WAVELENGTH</td><td colspan="4">λ1, λ2</td><td colspan="2">λ3</td><td></td></tr>
<tr><td>AVAILABLE DATA FORMAT</td><td colspan="4">SONET</td><td colspan="2">SONET</td><td></td></tr>
<tr><td>MAX. DATA RATE (GBPS)</td><td colspan="4">2.5</td><td colspan="2">2.5</td><td></td></tr>
<tr><td>INTERFACE NO.</td><td colspan="4">OG20</td><td colspan="2">OG21</td><td></td></tr>
</table>

FIG. 9
LINK STATE DATABASE

| FIELD | | ENTRY 1 | ENTRY 2 | ENTRY 3 | ENTRY 4 | ENTRY 5 | ENTRY 6 | ... | ENTRY n |
|---|---|---|---|---|---|---|---|---|---|
| OUTGOING NODE ADDRESS | | NODE-1 | NODE-2 | NODE-1 | NODE-2 | NODE-1 | NODE-1 | ----- | |
| INCOMING NODE ADDRESS | | NODE-2 | NODE-3 | NODE-2 | NODE-3 | NODE-3 | NODE-3 | ----- | |
| OUTGOING IF NUMBER | | OG10 | OG20 | OG11 | OG21 | OG10 | OG11 | ----- | |
| INCOMING IF NUMBER | | IC20 | IC30 | IC21 | IC31 | IC30 | IC31 | ----- | |
| CHANNEL 1 | CHANNEL NUMBER | #1 | #1 | #1 | #1 | #1 | #1 | ----- | |
| | CHANNEL COST | 1 | 1 | 1 | 1 | 3 | 4 | ----- | |
| | WAVELENGTH | λ1 | λ1 | λ3 | λ3 | λ1 | λ3 | ----- | |
| | DATA FORMAT | SONET | SONET | SONET | SONET | SONET | SONET | ----- | |
| | MAXIMUM DATA RATE | 2.5 | 2.5 | 2.5 | 2.5 | 2.5 | 2.5 | ----- | |
| | PATH NUMBER | P1 | P1 | P5 | P5 | P1 | P5 | ----- | |
| CHANNEL 2 | CHANNEL NUMBER | #2 | #2 | | | #2 | | ----- | |
| | CHANNEL COST | 1 | 1 | | | 3 | | ----- | |
| | WAVELENGTH | λ2 | λ2 | | | λ2 | | ----- | |
| | DATA FORMAT | SONET | SONET | | | SONET | | ----- | |
| | MAXIMUM DATA RATE | 2.5 | 2.5 | | | 2.5 | | ----- | |
| | PATH NUMBER | P2 | P2 | | | P2 | | ----- | |

MINIMUM COST ROUTING BASED ON RELATIVE COSTS OF NODE RESOURCES

BACKGROUND OF THE INVENTION

1. Field of the Invention

The present invention relates generally to communications networks where network nodes are interconnected by a number of links, and more specifically to a least-cost routing technique. The present invention is particularly useful for optical networks.

2. Description of the Related Art

In a prior art communications network as shown and described in Japanese Patent Publications 07-250356 and 10-276208, neighboring nodes are interconnected by a plurality of communication links that terminate a switching system of the nodes. Each node maintains a database that stores the status information of the links. A path controller exchanges the link status information with the neighboring nodes to update their database and determines a minimum cost route in response to a path setup request from a client device to produce a path setup signal. The switching system responds to the path setup signal for establishing a connection between the links specified by the determined route.

However, since the prior art is solely based on the costs associated with communication links, the route determined is not always the best for nodes involved in a given path if their node resources are different in quantity, size and type.

SUMMARY OF THE INVENTION

It is therefore an object of the present invention to improve the prior art routing decision by taking into account the per-channel costs of node resources.

According to a first aspect of the present invention, there is provided a network node for a communications network which comprises a plurality of network nodes interconnected by communication links, wherein the network node is one of the plurality of network nodes. The network node comprises a first module having a plurality of input ports and a plurality of output ports for handling a group of channels between the input ports and the output ports as a routing unit and a second module having an input port and an output port for handling a channel between the input port and the output port as the routing unit. A module state and link state databases are provided. In the module state database, module cost data of the first and second modules and module cost data of other network nodes are stored in the link state database link cost data of the communication links. Further provided is switching system for determining a route of minimum cost by using the module state database and the link state database and establishing, according to the determined route, a connection between one of a plurality of incoming communication links and one of the input ports of the first and second modules and establishing a connection between one of the output ports of the first and second modules and one of a plurality of outgoing communication links.

According to a second aspect, the present invention provides a communications network comprising a plurality of network nodes interconnected by incoming links and outgoing links. Each of the network nodes comprises a first module for handling a group of channels between its input ports and its output ports as a routing unit, a second module for handling a channel between its input port and its output port as a routing unit. A module state database stores module cost data of the first and second modules and module cost data of other nodes of the network and a link state database stores link cost data of the incoming and outgoing links. A switching system determines a route of minimum cost by using the module state database and the link state database and establishes, according to the determined route, a connection between one of said incoming links and one of the input ports of the first and second modules and establish a connection between one of the output ports of the first and second modules and one of said outgoing links. Terminating circuitry is provided for transmitting an advertisement message to neighboring network nodes for communicating the contents of the module state database and receiving an advertisement message from the neighboring network nodes for updating the module state database according to the received message.

According to a third aspect, the present invention provides a centralized network management system comprising a plurality of network nodes interconnected by a plurality of incoming communication links and a plurality of outgoing communication links, a management center connected to the network nodes via control channels. Each of the network nodes comprises a first module for handling a group of channels between its input ports and its output ports as a routing unit, a second module for handling a channel between its input port and its output port as a routing unit. A switching fabric having a plurality of incoming interfaces for interfacing incoming communication links and a plurality of outgoing interfaces for interfacing outgoing communication links. The management center comprises a module state database, a link state database and a path controller. The path controller store module cost data of the first and second modules of each of the network nodes into the module state database and link cost data of the incoming and outgoing communication links into the link state database and determines a route of minimum cost by using the module and link state databases. Path controller controls the switching fabric of each network node to establish a connection between one of the incoming interfaces and one of the input ports of the first and second modules and a connection between one of the output ports of the first and second modules and one of the outgoing interfaces.

According to a fourth aspect, the present invention provides a routing method comprising the steps of providing, in each of a plurality of network nodes interconnected by communication links, a first module having a plurality of input ports and a plurality of output ports, the first module handling a group of channels between the input ports and the output ports as a routing unit, providing a second module having an input port and an output port, the second module handling a channel between the input port and the output port as the routing unit, storing module cost data of the first and second modules in a module state database, storing link cost data of the communication links in a link state database, and determining a route of minimum cost by using the module state database and the link state database.

BRIEF DESCRIPTION OF THE DRAWINGS

The present invention will be described in detail further with reference to the following drawings, in which:

FIG. 2 is an illustration of the module state database of FIG. 1;

FIG. 3 is an illustration of the link state database of FIG. 1;

FIG. 4 is a flowchart of the operation of a path controller when transmitting a link or a module state advertisement message;

FIG. 5 is a flowchart of the operation of the path controller when receiving the link or module state advertisement message;

FIG. 6 is a flowchart of the operation of the path controller when a route of minimum cost is determined and a path is set up according to the determined route;

FIG. 8 is an illustration of the module state database of FIG. 7;

FIG. 9 is an illustration of the link state database of FIG. 7; and

DETAILED DESCRIPTION

Figure 1:
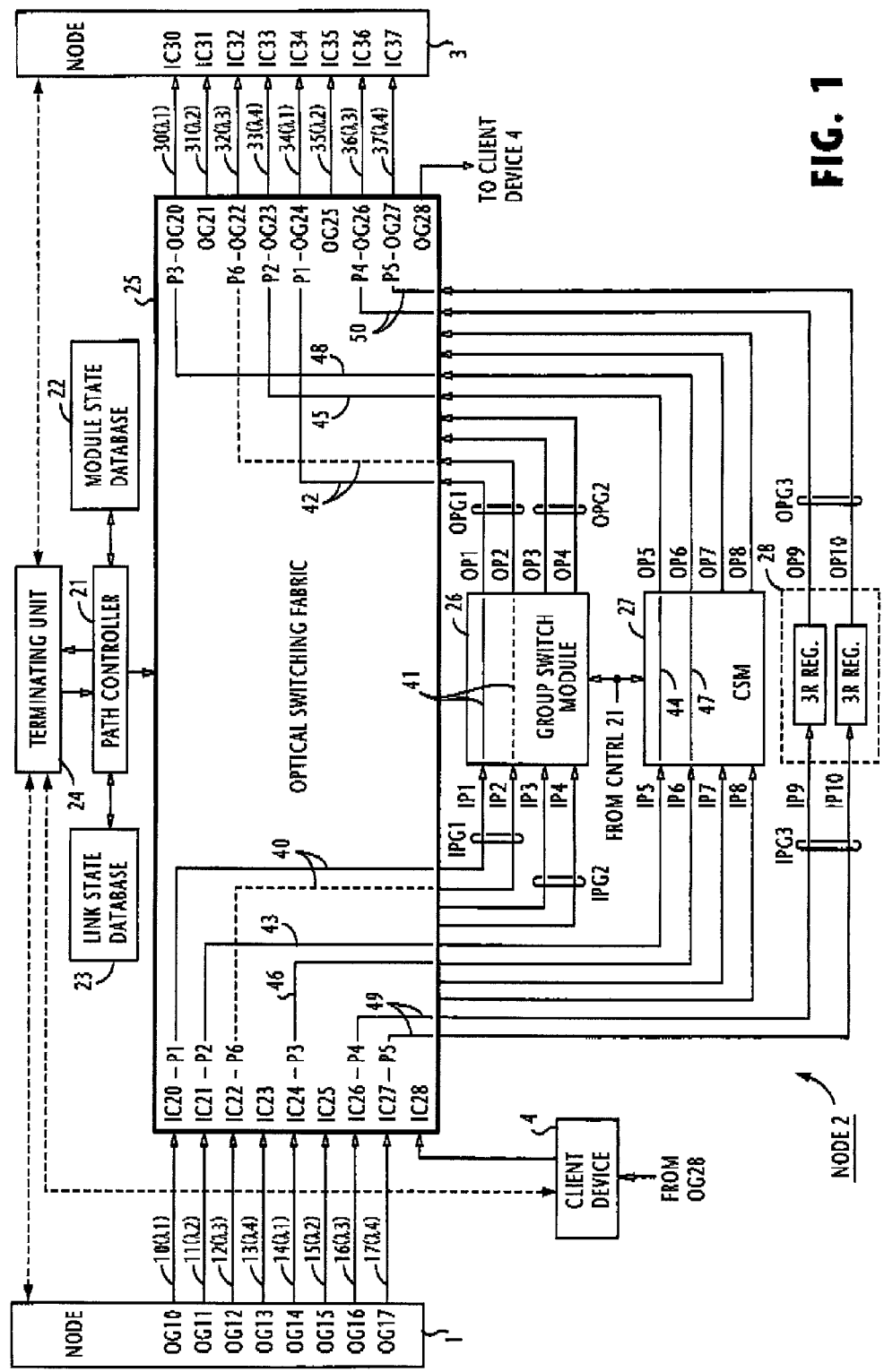
FIG. 1 is a block diagram of an optical communications network according to a first embodiment of the present invention.

An optical network according to a first embodiment of the present invention is shown in FIG. 1. The network comprises a plurality of optical nodes 1, 2 and 3 interconnected by optical links for transporting traffic signals and control channels for transmission of control messages. As a representative node, details of node 2 are illustrated.

According to the definition of the present invention, a "path" is a transmission unit established between two nodes via at least one intermediate node, a "link" is a transmission medium established between two neighboring nodes, a "forwarding adjacency link" is a virtual transmission medium established between two nodes via at least one intermediate node, and a "channel" is a logical transmission unit established between two neighboring nodes. By using wavelength multiplexing technique, a plurality of channels can be accommodated in a single link and a plurality of paths can be accommodated in a single forwarding adjacency link.

Node 2 is comprised of a switch fabric 25 and a number of node resources implemented with manufacturing units, or modules such as a group switch module (GSM) 26, a channel switch module (CSM) 27 and a group regenerator module (GRM) 28. These modules are classified as group-associated modules and channel-associated modules. The group-associated modules are designed to handle a group of channels as a routing unit, while the channel-associated modules are designed to handle channels as individual routing units. The group-associated modules are implemented with as low a production cost as possible for a given volume of traffic, so that their per-channel cost is less than the corresponding cost of the channel-associated modules. Therefore, it is advantageous to use the group-associated modules for applications in which a heavy traffic volume can be divided into a group of channels of same route, whereas the channel-associated modules may be advantageous for low-traffic applications.

Therefore, the group switch module 26 has a lower per-channel cost than the corresponding cost of the channel switch module 27. Group regenerator module 28 is a product that is manufactured as a group-associated module and includes, for example, two 3R (reshaping, retiming, regeneration) regenerators. Thus, the per-channel cost of GRM 28 is less tan the per-channel cost of an individual 3R regenerator.

As will be described, the present invention provides least cost route decision based on the per-channel cost of node resources.

Node 1 has outgoing (OG) interfaces OG10~OG17 which are connected to corresponding incoming (IC) interfaces IC20~IC27 of node 2 using optical links 10~17. Eight optical links 30~37 connect outgoing interfaces OG20~OG27 of node 2 to incoming interfaces IC30~IC37 of node 3. Each optical link carries a single wavelength channel which is one of four wavelengths λ1, λ2, λ3 and λ4, as illustrated. A client device 4 is provided, which is terminated at an incoming interface IC28 and an outgoing interface OG28 of node 2.

Switched connections are established in the switching fabric 25 so that the incoming interfaces IC20~IC28 can be connected to any of the input ports of node resources 26, 27 and 28 and the output ports of these node resources can be connected to any of the outgoing interfaces OG20~OG28. However, outgoing interfaces of the switching fabric 25 are selected depending on whether the node resources have the ability to provide wavelength conversion and on which incoming interfaces are used.

In the group switch module 26, the input (IF) ports IP1~IP4 are divided into two input port groups IPG1 and IPG2 and the output (OP) ports of OP1~OP4 are likewise divided into two output port groups OPG1 and OPG2. In the illustrated example, incoming group connections 40 are established in the switching fabric 25 for connecting the incoming interfaces IC20, IC21 to the input ports IP1, IP2 of the group switch module 26 and outgoing group connections 42 for connecting the output ports OP1, OP2 of the module 26 to the output interfaces OG22, OP23. Simultaneously with the establishment of connections 40 and 42, the group switch module 26 sets up connections 41 between the input ports IP1, IP2 and the output ports OP1, OP2. Note that the connection P6 indicated by dotted line 40 is a standby path which can be used as what is called a "forward adjacency link" which remains in the established state for future demand from users. Accordingly, when at least one path is established through the group switch module 26, two incoming connections and two outgoing connections are simultaneously established in the switching fabric 25 no matter whether all of the established connections are immediately used for carrying traffic.

Channel switch module 27 establishes a channel connection between one of its input ports IP5~IP8 and one of its output ports OP5~OP8. In one example, connections 43, 46 and 45, 48 are established in the switching fabric 25 for connecting the incoming interfaces IC22, IC24 to the input ports IP5, IP7 and connecting the output ports OP5, OP7 to the output interfaces OG24, OP26. In this case, the channel switch module 27 may establish channel connections 44 and 47 between the input ports IP5, IP7 and the output ports OP5, OP7. It is assumed that the channel switch module 27 has the ability to convert the wavelength of any of its channels at the input ports IP5 to IP8 to the wavelength of desired outgoing interfaces OG.

In the case of the group regenerator module 28, group connections 49 and 50 are established in the switching fabric 25 to connect the incoming interfaces 26, 27 to the input ports IP9, IP10 of group IPG3 of the module 28 and connect the output ports OP9, OP10 of group OPG3 to the outgoing interfaces OG20, OG21.

Switching fabric 25 is controlled by a path controller 21. Preferably, the group and channel witch modules 26 and 27 are also controlled by the path controller 21. Node 2 maintains a module (or node) state database 22 and a link state database 23. As will be described in detail, the module state database 22 is controlled by the path controller 21 to store module status data indicating the status of resources of nodes 1, 2 and 3 when a new module is installed and update the stored module status data when an existing module is removed or modified. Path controller 21 transmits a module state advertisement message to the network to inform the neighboring nodes of the new status of the node modules.

In like manner, the link state database 23 is controlled by the path controller 21 to store link state data of optical links of nodes 1, 2 and 3 when a new link is installed as well as link state data of a link known as a "forwarding adjacency link" which connects nodes 1 and 3. When an existing link is removed or modified, the database 23 is controlled to update the stored link state data. Path controller 21 transmits a link state advertisement message to the network to inform neighboring nodes of the new status of the links. Therefore, the link and module status information maintained by the nodes 1, 2 and 3 are compared with each other to share the same knowledge of network resources.

Path controller 21 of node 2 exchanges link and module state advertisement messages with nodes 1 and 3 over control channels established by a terminating unit 24. Terminating unit 24 also receives a request message from the client device 4. The received request message is processed by the path controller 21 to determine and establish a path through the network according to the link and module state database.

FIG. 2 shows details of the module state database 22. Module state database 22 is divided into a plurality of entries corresponding to different node modules of its own node as well as the node modules of other nodes of the network. Each entry of the module state database 22 is divided into a plurality fields for indicating attributes of the module (such as module number, module type and wavelength convertibility) and a path number field for indicating path numbers of the module. The entry of each module is further divided into a plurality of input-port fields and a plurality of output-port fields for indicating the various attributes of the input and output ports, such as port number, port group number, port cost, available wavelength, available data format, maximum data rate, and interface number. Each of the input- and output-port fields is sub-divided into a number of sub-fields corresponding to path numbers for specifying attributes of the input and output ports associated with the path numbers.

The following is a description of the contents of the module state database 22 of FIG. 2 by assuming that switched connections are set up in the switching fabric 25 as shown in FIG. 1.

Entry 1 of module state database 22 contains the information of group switch module 26, including its module number, module type and unavailability of wavelength conversion. The input-port fields of entry 1 are divided into four sub-fields corresponding to input ports IP1, IP2, PI3 and IP4.

In the entry 1, the sub-fields of input port IP1 indicate that port IP1 belongs to port group IPG1 and that a path identified by path number P1 is established from the incoming interface IC20 and the normalized cost of this input port is "1" and the available wavelength, the available data format and the maximum data rate of the incoming wavelength channel at input port IP1 can be arbitrarily determined. The sub-fields of output port OP1 indicate that port OP1 belongs to port group OPG1 and that a path P1 is established from this output port to the outgoing interface OG24 and the normalized cost of this input port is "1". The available wavelength, the available data format and the maximum data rate of the incoming wavelength channel at the output port OP1 determined dependent on the values of the corresponding input ports. For a path P6 established on a forwarding adjacency link between nodes 1 and 3, the attributes of the group switch module 26 are indicated by specifying the input port number IP2, the incoming interface number IC22, the port cost=1, and the output port number OP2, the outgoing interface number OG22 and the port cost=1.

In the sub-fields of input port IP2 which also belongs to port group IPG1, the corresponding path number sub-field is left blank to indicate that no path is established for IP2, but a connection is established in the switching fabric 25 from the incoming interface IC22 to input port IP2. The normalized cost of input port IP is "1" and the available wavelength, the available data format and the maximum data rate of the incoming wavelength channel at input port IP2 are left blank. In the sub-fields of output port OP2 which belongs to port group OPG1, the corresponding path number sub-field is left blank to indicate that no path is established for OP2, but a connection is established in the switching fabric 25 from output port OP2 to the outgoing interface OG22. The normalized cost of input port OP is "1" and the available wavelength, the available data format and the maximum data rate of the incoming wavelength cannel at input port IP2 are left blank.

Entry 2 of database 23 contains the information of channel switch module 27, including its module number, module type and availability of wavelength conversion. The input-port fields of entry 2 are divided into four sub-fields corresponding to input ports IP5, IP6, PI7 and IP8. The input port cost of the channel switch module 27 is "2", for example, and the available wavelength, data format and maximum data rate of the channel switch module 27 are predetermined. For input port IP5, the associated sub-fields contain information indicating that a path P2 is established from the incoming interface IC21 to the input port IP5. Similarly, the sub-fields of input port IP6 contain information indicating that a path P3 is established from the incoming interface IC24 to the input port IP6. The output port cost of the channel switch module 27 is "2", for example, and the available data format and maximum data rate of the channel switch module 27 are predetermined, However, the available wavelength can be arbitrarily determined because of the wavelength conversion capability of the module 27. The sub-fields of output port OP5 contain information indicating that the path P2 is established from output port OP5 to the outgoing interface OG23. Similarly, the sub-fields of output port OP6 contain information indicating that the path P3 is established from port OP6 to the outgoing interface OG20.

Entry 3 of database 23 contains the information of group regenerator module 28, including its module number, module type and availability of wavelength conversion. The input-port fields of entry 3 are divided into two sub-fields corresponding to input ports IP9 and IP10. The normalized input port cost of the group regenerator module 28 is "1", and the available a wavelength, data format and maximum data rate of the module 28 are predetermined. Sub-fields of input port IP9 indicate that a path P4 is established from the incoming interface IC26 to the input port IP9. Similarly, the sub-fields of input port IP10 indicate that a path P5 is established from the incoming interface IC27 to the input port IP10. The output port cost of the group regenerator module 28 is "1", and the available wavelength, data format and maximum data rate of the module 28 are predetermined. The sub-fields of output port OP9 indicate that the path P4 is established from the output port OP9 to the outgoing interface OG26. Similarly, the sub-fields of output port OP10 indicate that the path P5 is established from the port OP10 to the outgoing interface OG27.

Details of the link state database 23 are shown in FIG. 3. Link state database 23 of node 2 is divided into a number of link entries corresponding to links between nodes 1 and 2 and link between nodes 2 and 3 and forwarding adjacency links between nodes 1 and 3 via node 2. Each of the link entries is sub-divided into a plurality of fields to define a number of attributes of each link. The defined attributes of a link include the node addresses of transmit and receive nodes, the outgoing and incoming interface numbers, the link cost, the wavelength of the link, the data format, the maximum data rate and the path number.

The link entry 1 of database 23, for example, specifies attribute data of link 10 by giving the addresses of nodes 1 and 2, outgoing (OG) interface number=OG10, incoming (IC) interface number=IC20, link cost=1, wavelength=$\lambda 1$, and path number=P1. For path P6 established on a forwarding adjacency link between nodes 1 and 3, a link entry 2 is defined to specify the attributes of the forwarding adjacency link by indicating the addresses of transmit and receive nodes 1 and 3, outgoing interface number=OG12, incoming interface number=IC32, link cost=4(=1+2+1), wavelength=$\lambda 1$, and path number=P6. The link cost includes the total cost of links 10 and 30 plus the total cost of input port IP1 and output port OP1 of group switch module 26.

Since the forwarding adjacency link entries include data of total forwarding adjacency link cost, route computations can be simplified.

The present invention is further characterized by the transmission of the module and link state advertisement messages from the path controller to neighboring nodes and the reception of these messages for creating or updating an entry in the databases of the neighboring nodes. The link and module state advertisement messages are hereinafter called "resource" state advertisement messages since the process associated with transmission and reception of a module state advertisement message is identical to the process associated with transmission and reception of a link status advertisement message. Further, links and node modules are collectively called "resources" and the link and module state databases are called "resource state databases".

FIG. 4 is a flowchart of the operation of path controller 21 of node 2 when transmitting a resource state advertisement message. When a new resource is installed or established in the node 2, the decision at step 401 is affirmative and flow proceeds to step 402 to add a new entry to the corresponding resource database for storing status data associated with the new resource. If the decision at step 401 is negative or a new entry is created at step 402, flow proceeds to decision step 403 to check to see if an existing resource is removed. If this is the case, an entry corresponding to the removed resource is removed from the corresponding resource state database. If the decision at step 403 is negative or an entry is removed at step 404, flow proceeds to decision step 405 to check to see if the status data of an existing resource is modified. If so, a corresponding entry of the database is modified at step 406.

The next decision is to determine if a resource state advertisement message is to be sent to the network at step 407. If the pat controller has executed step 402, 404 or 406, the controller proceeds to step 408 and formulates a resource state advertisement message with necessary data and sends it to the nodes 1 and 3 via the terminating unit 24.

In FIG. 5, the path controller of each node monitors the associated terminating unit 24 to receive a resource state advertisement message, When such a message is received (step 501), the controller 21 determines whether it contains a new resource entry, a removed entry or a modified entry by comparing the contents of the advertisement message with those of the corresponding database. If new resource entry data is contained in the received advertisement message (step 502), a new entry is created in the corresponding resource state database (step 503). If the comparison indicates that an existing entry of the database is missing in the received advertisement message, the existing entry is removed from the database (step 505). If the comparison indicates that differences exist between an entry of the advertisement message (step 506) and the corresponding entry of the database, the latter is modified according to the entry of the message (step 507). At step 508, the path controller 21 retransmits the received advertisement message to adjacent nodes, and returns to the starting point of the routine.

Since the data concerning the attributes of resources (such as module number, module type, port number, port group number, wavelength, data format, data rate) remains relatively static, while the data concerning the attributes of paths vary from instant to instant, the data concerning the attributes of resources are formulated in a resource (module/link) state advertisement message and flooded to all nodes of the network. On the other hand, the data concerning the path attributes are formulated in a signaling message and transmitted to downstream nodes. The processes associated with the transmission and reception of the signaling message are identical to those described above with reference to the resource state advertisement message.

When the client device 4 establishes a path through the network, it sends a path setup message to the path controller 21. The process performed by the path controller 21 during a path setup mode is shown in FIG. 6. When the path controller receives a path setup message (step 601), it searches the link state database 23 for links that are available along possible routes to the destination node specified in the setup message (step 602). If available routes are found (step 603), the path controller makes a search through the module state database 22 for available node modules (step 604). If available node modules are found (step 605), the path controller proceeds to step 606 to form candidate paths using the available links and the available node modules. A total cost of each of the candidate paths is calculated (step 607) and all total costs are compared and one of the candidate paths having a minimum value is determined as a path to the destination (step 608). At step 609, connections are established in the switching fabric 25 according to the routing data of the determined path. Path controller 21 formulates with the routing data of the path and transmits a path setup message to a downstream node to cause it to establish connections (step 610). If the downstream node is an intermediate node of the path, it will reformulate a path setup message and transmits it downstream.

In the previous embodiment, databases 22 and 23 are managed on a per-channel basis, and route calculation and decision are performed on a per-channel basis.

According to a second embodiment of the present invention, channels of different wavelengths are multiplexed onto inter-node optical links (physical links). A series of concatenated links, or forwarding adjacency (FA) links (virtual links) are established between two network nodes via at least one intermediate node. Each virtual link can transport at least one wavelength channel. With respect to the physical and virtual links, a group of wavelength channels is handled as a unit for making a routing decision. In each of the network nodes the group switch module is a link switch designed to handle a group of wavelength channels as a route decision unit, and the channel switch module is designed to handle each wavelength as a route decision unit. Note that the input port of the channel switch module has the ability to tune to any of the multiplexed incoming wavelengths and the output port has the ability to tune to any of the multiplexed outgoing wavelengths.

Figure 7:
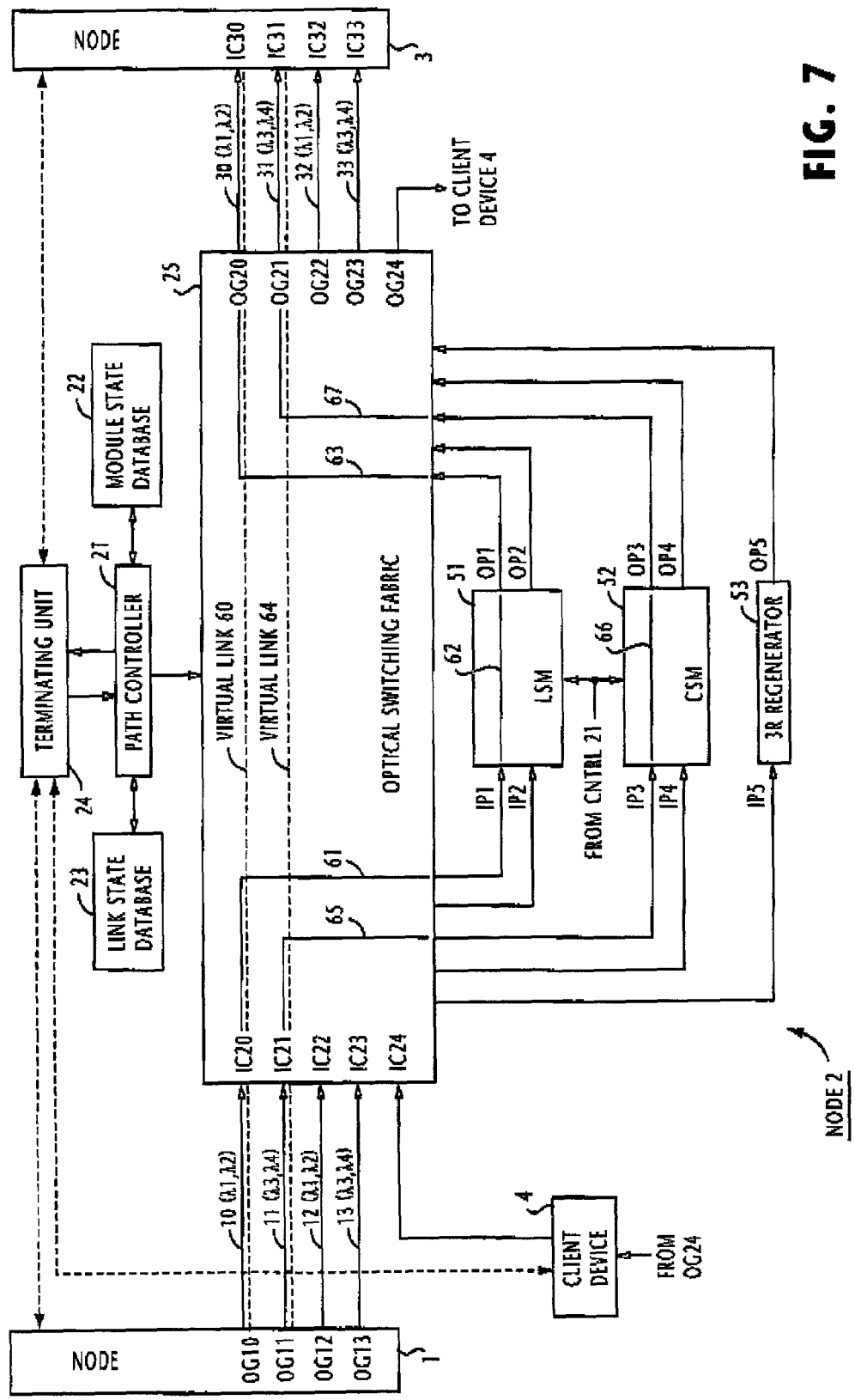
FIG. 7 is a is a block diagram of an optical communications network according to a second embodiment of the present invention.

One example of the second embodiment of this invention is shown in FIG. 7. Nodes 1 and 2 are connected by optical links 10~13 and nodes 2 and 3 are connected by optical links 30~33. A pair of wavelengths λ1 and λ2 or a pair of wavelengths λ3 and λ4 are multiplexed onto each optical link, as illustrated. Node 2 includes a link switch module 51, a channel switch module 52 and a channel-associated regenerator 53.

Link switch module 51 has two input ports IP1 and IP2 and two output ports OP1 and OP2 for connecting any of the input ports to any of the output ports on a per-link basis, i.e., on a per-multiplex group basis, Channel switch module 52 has two input ports IP3 and IP4 and two output ports OP3 and OP4 for connecting any of the input ports to any of the output ports on a per-channel basis. Each of the input ports IP3 and IP4 has the function of tuning to any of the incoming wavelengths λ1~λ4 and each of the output ports OP3 and OP4 has the function of tuning to any of the outgoing wavelengths λ1~λ4.

A 3R regenerator 53 is provided as a channel-associated module having an input port IP5 and an output port OP5.

In response to a switching control signal from the path controller 21, the switching fabric 25 establishes a connection between any of its incoming interfaces IC20~IC24 to any of the input ports IP1~IP5 and a connection between any of the output ports OP OPS to any of its outgoing interfaces OG20~OG24. Since the link switch module 51 is capable of carrying four wavelength channels, the per-channel cost of this module is lower than the corresponding cost of the channel switch module 52.

Path controller 21 formulates the switching control signal using module and link status data stored in the databases 22 and 23. Details of the module state database 22 and link state database 23 of FIG. 7 are respectively shown in FIGS. 8 and 9 by assuming that the node 2 establishes a virtual link 60 of channels λ1 and λ2 between nodes 1 and 3 with connections 61, 62 and 63 and a virtual link 63 of channel λ3 with connections 65, 66 and 67, and that path numbers P1, P2 and P5 are assigned to channels λ1, λ2 and λ3, respectively.

As shown in FIG. 8, the module state database 22 of FIG. 7 defines entries 1, 2 and 3 for modules 51, 52 and 53, respectively. Each entry lists module attributes including module number, module type and wavelength convertibility and for each module entry one or more path attributes are defined, with the path attributes being divided into those associated with the input port of the module and those associated with the output port. For entry 1 of the link switch module 51, path numbers P1 and P2 are specified for channels λ1 and λ2. Port cost of the input port number IP1 is set equal to 1 and the port cost of the output port number OP1 is set equal to 1. In the entry 2, the status data associated with the channel switch module 52 indicates that the path number is P5 and the channel wavelength is λ3. Port cost of the input port number IP3 is set to 2 which is higher than the port cost of module 51 and the port cost of the output port number OP3 is also set to 2.

In FIG. 9, the link state database 23 of FIG. 7 is divided into a plurality of physical link entries and a plurality of virtual link entries. The physical link entries are associated individually with the incoming optical links 10~13 and the outgoing optical links 30~33. Each physical link entry defines in the node address fields the attributes of a physical link between adjacent nodes 1 and 2 or a physical link between adjacent nodes 2 and 3. The virtual link entries are associated with virtual links established between the nodes 1 and 3 via node 2. Each virtual link includes multiplexed wavelength channels and defines a virtual link between nodes 1 and 3 via node 2 in the node address fields. All physical and virtual link entries are divided into two fields corresponding to different wavelength channels. In the illustrated example, two channel fields are contained in each link entry.

The channel cost of a physical link is a cost associated with a wavelength channel carried by the physical link. Physical link entries 1 and 2 are defined for the attributes of the incoming and outgoing links associated with the link switch module 51. In the physical link entry 1 for the incoming link from node 1 to node 2 which uses outgoing interface OG10 and incoming interface IC20, channel cost of 1 is set for both channel #1 and channel #2. In like manner, in the physical link entry 2 for the outgoing link from node 2 to node 3 which uses outgoing interface OG20 and incoming interface IC30, channel cost of 1 is set both for channel #1 and channel #2.

Physical link entries 3 and 4 are defined for the attributes of the incoming and outgoing links associated with the channel switch module 52. In the physical link entry 3 for the incoming link from node 1 to node 2 which uses outgoing interface OG11 and incoming interface IC21, channel cost of 1 is set for channel #1 and in the physical link entry 4 for the outgoing link from node 2 to node 3 which uses outgoing interface OG21 and incoming interface IC31, channel cost of 1 is set for channel #1.

Virtual link entries 1 and 2 are defined for the attributes of virtual links 60 and 64. The channel cost of a virtual link is a total cost of incoming and outgoing physical links and one of the node modules through which the virtual link is established. In the virtual link entry 1 which uses outgoing interface OG10 of node 1 and incoming interface IC30 of node 3, channel cost of 3 (=1+1+1) is set for both channels #1 and #2 (λ1 and λ2). In the virtual link entry 2 which uses outgoing interface OG11 of node 1 and incoming interface IC31 of node 3, channel cost of 4 (=1+2+1) is set for channel #1 (λ3).

The multiplexing of different wavelengths on a single optical link results in the reduction of the number of ports required for group-associated node modules and in the simplification of route computations. Additionally, the provision of the virtual link entries including total channel cost further simplifies route computations.

In the previous embodiments, temporary mismatches among the databases of the network nodes 1, 2 and 3 or possible inter-node out-of-synchronization may occur. Centralized management of databases and routing control could solve his problem.

Figure 10:
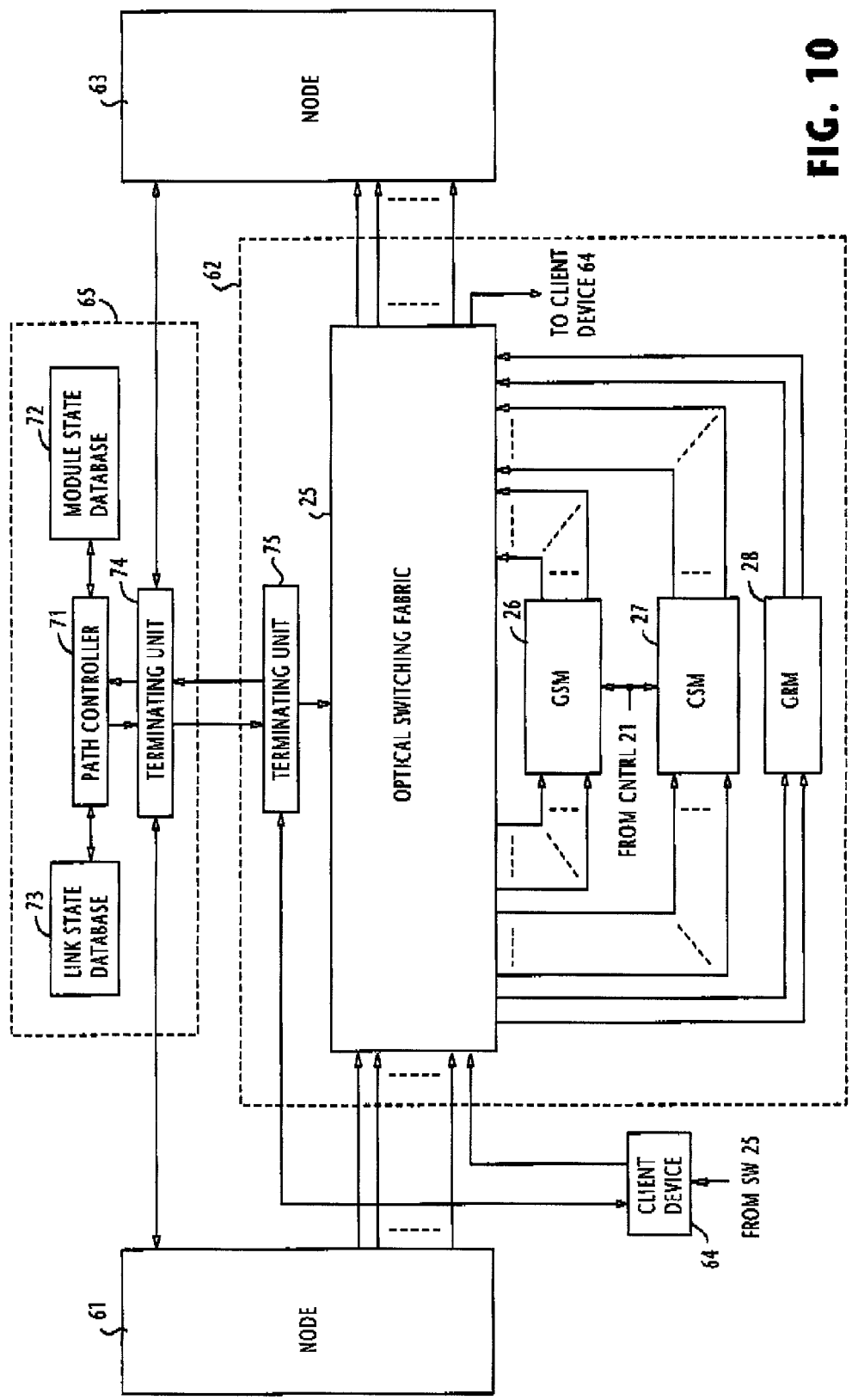
FIG. 10 is a block diagram of an optical communications network according to a third embodiment of the present invention.

FIG. 10 shows an embodiment to implement the centralized management with a network management center 65 that performs centralized management of routing control for a plurality of nodes 61, 62 and 63 of identical configuration. A client device 64 is shown connected to the node 62, for example. In FIG. 10, parts corresponding in significance to those in FIG. 1 are marked with the same numerals as those in FIG. 1 and the description thereof is omitted for simplicity. Network management center 65 includes a path controller 71, a module state database 72, a link state database 73 and a terminating unit 74. Path controller 71 collects module and link status information from nodes 61, 62 and 63 via the terminating unit 74 and updates the corresponding databases 72 and 73. To exchange information with the management center 65, each node is provided with a terminating unit 75 to which the client device 64 is also connected. The module and link status information of all network nodes are therefore stored in the databases 72 and 73 and maintained by the center 65.

When a path setup message is sent from the client device 64 to the node 62, it is retransmitted to the path controller 71. In response, the path controller 71 determines a minimum cost route using the databases 72 and 73 and formulates source and destination control signals based on the determined route and sends the source control signal to the node 62 and the destination control signal to a node specified in the path setup message.

What is claimed is:

1. A network node for a communications network which comprises a plurality of network nodes interconnected by communication links, wherein said network node is one of said plurality of network nodes, comprising:
   a first module, having a plurality of input ports and a plurality of output ports, for handling a group of channels between said input ports and said output ports as a routing unit;
   a second module, having an input port and an output port, for handling a channel between the input port and the output port as said routing unit;
   a module state database for storing module cost data of said first and second modules and module cost data of other network nodes;
   a link state database for storing link cost data of said communication links,
   a switching system for determining a route of minimum cost by using said module state database and said link state database and establishing, according to the determined route, a connection between one of a plurality of incoming communication links and one of the input ports of said first and second modules and establishing a connection between one of the output ports of said first and second modules and one of a plurality of outgoing communication links, wherein said switching system determines said route of minimum cost by:
   detecting available links along possible routes in said link state database and detecting available first and second modules in said module state database;
   forming a plurality of candidate paths by using the available links and the available first and second modules;
   calculating costs of said candidate paths by using said module and link state database; and
   determining one of said candidate paths having a minimum value of the calculated costs as said route of minimum cost.

2. The network node of claim 1, wherein the network node is an intermediate node between first and second network nodes, and wherein said link state database includes a first plurality of link entries for storing status of links to said first and second network nodes and a second plurality of link entries for storing status of forwarding adjacency links between said first and second network nodes, said second plurality of link entries containing a total cost of said links and modules.

3. The network node of claim 2, wherein said switching system is an optical switching system, and said incoming and outgoing links are optical links and said channels are wavelength channels.

4. The network node of claim 3, wherein said first module comprises an optical switch module for simultaneously establishing a plurality of connections between said plurality of input ports and said plurality of output ports for carrying a plurality of said wavelength channels and said second module comprises an optical switch module for establishing a connection at a time between said input port and said output port for carrying a wavelength channel.

5. The network node of claim 4, wherein said second module is capable of converting the wavelength of said wavelength channel to a different wavelength.

6. The network node of claim 3, wherein said first module comprises an optical regenerator module for simultaneously performing an optical regeneration process on a plurality of said wavelength channels.

7. The network node of claim 3, wherein said second module comprises an optical regenerator module for performing an optical regeneration process on a wavelength channel.

8. The network node of claim 3, wherein a plurality of wavelengths are multiplexed on each of said incoming links and each of said outgoing links, and wherein said first module simultaneously handles said multiplexed wavelengths as said routing unit and said second module selects one of the multiplexed wavelengths for handling the selected wavelength as said routing unit.

9. The network node of claim 1, wherein the network node is an intermediate node between first and second network nodes, and wherein said link state database includes a plurality of physical link entries for storing status of links to each of said first and second network nodes and a plurality of virtual link entries for storing status of concatenated links between said first and second network nodes, said virtual link entries containing a cost of each of said virtual links.

10. The network node of claim 1, further comprising terminating circuitry for transmitting a message to neighboring network nodes for communicating the contents of said module and link state databases and receiving a message from said neighboring network nodes for updating said module and link state databases according to the received message.

11. A communications network comprising:
   a plurality of network nodes interconnected by a plurality of incoming communication links and a plurality of outgoing communication links,
   each of said network nodes comprising:
   a first module, having a plurality of input ports and a plurality of output ports, for handling a group of channels between said input ports and said output ports as a routing unit;
   a second module, having an input port and an output port, for handling a channel between the input port and the output port as said routing unit;
   a module state database for storing module cost data of said first and second modules and module cost data of other network nodes;
   a link state database for storing link cost of each of said incoming links and each of said outgoing links,
   a switching system for determining a route of minimum cost by using said module state database and said link state database and establishing, according to the determined route, a connection between one of the incoming communication links and one of the input ports of said first and second modules and establishing a connection between one of the output ports of said first and second modules and one of said outgoing communication links;

terminating circuitry for transmitting a message to neighboring network nodes for communicating the contents of said module state database and receiving a message from said neighboring network nodes for updating said module state database according to the received message, wherein said switching system determines said route of minimum cost by:

detecting available links along possible routes in said link state database and detecting available first and second modules in said module state database;

forming a plurality of candidate paths by using the available links and the available first and second modules;

calculating costs of said candidate paths by using said module and link state database; and determining one of said candidate paths having a minimum value of the calculated costs as said route of minimum cost.

12. The communications network of claim 11, wherein said each network node is an intermediate node between first and second network nodes, and wherein said link state database includes a plurality of link entries for storing status of links to each of said first and second network nodes and a plurality of channel entries for storing status of channels between said first and second network nodes, said channel entries containing a total cost of said channels and said modules.

13. The communications network of claim 11, wherein said switching system is an optical switching system, and said incoming and outgoing links are optical links and said channels are wavelength channels.

14. The communications network of claim 13, wherein said first module comprises an optical switch module for simultaneously establishing a plurality of connections between said plurality of input ports and said plurality of output ports for carrying a plurality of said wavelength channels and said second module comprises an optical switch module for establishing a connection at a time between said input port and said output port for carrying a wavelength channel.

15. The communications network of claim 14, wherein said second module is capable of converting the wavelength of said wavelength channel to a different wavelength.

16. The communications network of claim 14, wherein said first module comprises an optical regenerator module for simultaneously performing an optical regeneration process on a plurality of said wavelength channels.

17. The communications network of claim 14, wherein said second module comprises an optical regenerator module for performing an optical regeneration process on a wavelength channel.

18. The communications network of claim 14, wherein a plurality of wavelengths are multiplexed on each of said incoming links and each of said outgoing links, and wherein said first module simultaneously handles said multiplexed wavelengths as said routing unit and said second module selects one of the multiplexed wavelengths for handling the selected wavelength as said routing unit.

19. The communications network of claim 11 wherein said each network node is an intermediate node between first and second network nodes, and wherein said link state database includes a first plurality of link entries for storing status of links to said first and second network nodes and a second plurality of link entries for storing status of forwarding adjacency links between said first and second network nodes, said second plurality of link entries containing a total cost of said links and said modules.

20. A centralized network management system comprising:

a plurality of network nodes interconnected by communication links;

a management center connected to said network nodes via control channels, each of said network nodes comprising:

a first module, having a plurality of input ports and a plurality of output ports, for handling a group of channels between said input ports and said output ports as a routing unit;

a second module, having an input port and an output port, for handling a channel between the input port and the output port as said routing unit; and a switching fabric having a plurality of incoming interfaces for interfacing incoming links and a plurality of outgoing interfaces for interfacing outgoing links; and said management center comprising:

a module state database;

a link state database for storing link cost of each of said incoming links and each of said outgoing links;

a path controller for storing module cost data of said first and second modules of each of said network nodes into said module state database and determining a route of minimum cost by using said module state database and said link state database and controlling said switching fabric to establish a connection between one of the incoming interfaces and one of the input ports of said first and second modules and establish a connection between one of the output ports of said first and second modules and one of said outgoing interfaces, wherein said path controller determines said route of minimum cost by:

detecting available links along possible routes in said link state database and detecting available first and second modules in said module state database;

forming a plurality of candidate paths by using the available links and the available first and second modules;

calculating costs of said candidate paths by using said module and link state database; and determining one of said candidate paths having a minimum value of the calculated costs as said route of minimum cost.

21. The centralized network management system of claim 20, wherein said each network node is an intermediate node between first and second network nodes, wherein said link state database includes a first plurality of link entries for storing status of links to said first and second network nodes and a second plurality of link entries for storing status of forwarding adjacency links between said first and second network nodes, said second plurality of link entries containing a total cost of said links and said modules.

22. The centralized network management system of claim 20, wherein said switching fabric is an optical switching fabric, and said incoming and outgoing links are optical links and said channels are wavelength channels.

23. The centralized network management system of claim 22, wherein said first module comprises an optical switch module for simultaneously establishing a plurality of connections between said plurality of input ports and said plurality of output ports for carrying a plurality of said wavelength channels and said second module comprises an optical switch module for establishing a connection at a time between said input port and said output port for carrying a wavelength channel.

24. The centralized network management system of claim 23, wherein said second module is capable of converting the wavelength of said wavelength channel to a different wavelength.

25. The centralized network management system of claim 23, wherein said second module comprises an optical regenerator module for performing an optical regeneration process on a wavelength channel.

26. The centralized network management system of claim 23, wherein said first module comprises an optical regenerator module for simultaneously performing an optical regeneration process on a plurality of said wavelength channels.

27. The centralized network management system of claim 22, wherein a plurality of wavelengths are multiplexed on each of said incoming links and each of said outgoing links, and wherein said first module simultaneously handles said multiplexed wavelengths as said routing unit and said second module selects one of the multiplexed wavelengths for handling the selected wavelength as said routing unit.

28. The centralized network management system of claim 20 wherein said each network node is an intermediate node between first and second network nodes, and wherein said link state database includes a first plurality of link entries for storing status of links to said first and second network nodes and a second plurality of link entries for storing status of forwarding adjacency links between said first and second network nodes, said second plurality of link entries containing a total cost of said links and said modules.

29. A routing method comprising the steps of:
a) providing, in each of a plurality of network nodes interconnected by communication links, a first module having a plurality of input ports and a plurality of output ports, the first module handling a group of channels between said input ports and said output ports as a routing unit;

b) providing, in each of a plurality of network nodes, a second module having an input port and an output port, the second module handling a channel between the input port and the output port as said routing unit;

c) storing module cost data of said first and second modules of said plurality of network nodes in a module state database;

d) storing link cost of said communication links in a link state database; and e) determining a route of minimum cost by using said module state database and said link state database, wherein the step (e) comprises the steps of:

detecting available links along possible routes in said link state database and detecting available first and second modules in said module state database;

forming a plurality of candidate paths by using the available links and the available first and second modules;

calculating costs of said candidate paths by using said module and link state database; and determining one of said candidate paths having a minimum value of the calculated costs as said route of minimum cost.

* * * * *